(12) United States Patent
Khokhar

(10) Patent No.: US 8,135,414 B2
(45) Date of Patent: Mar. 13, 2012

(54) METHOD AND SYSTEM FOR MOBILE TRAJECTORY BASED SERVICES

(75) Inventor: Sarfraz Khokhar, Raleigh, NC (US)

(73) Assignee: Cisco Technology, Inc., San Jose, CA (US)

(*) Notice: Subject to any disclaimer, the term of this patent is extended or adjusted under 35 U.S.C. 154(b) by 1105 days.

(21) Appl. No.: 11/847,863

(22) Filed: Aug. 30, 2007

(65) Prior Publication Data

US 2009/0061903 A1    Mar. 5, 2009

(51) Int. Cl.
*H04W 24/00* (2009.01)

(52) U.S. Cl. .............. 455/456.1; 455/440; 455/556.1; 701/209; 701/213; 701/300; 701/29; 340/988; 340/995.23

(58) Field of Classification Search ............ 455/456.1, 455/456.3, 445; 700/245, 213; 701/29, 200, 701/202, 209; 340/23, 988, 995
See application file for complete search history.

(56) References Cited

U.S. PATENT DOCUMENTS

| | | | |
|---|---|---|---|
| 7,016,781 B1* | 3/2006 | Wolfson | 701/209 |
| 2002/0068580 A1* | 6/2002 | Bala et al. | 455/456 |
| 2004/0254811 A1* | 12/2004 | Horstemeyer | 705/1 |
| 2005/0060069 A1* | 3/2005 | Breed et al. | 701/29 |
| 2007/0208497 A1* | 9/2007 | Downs et al. | 701/117 |
| 2009/0036102 A1* | 2/2009 | Ho | 455/412.2 |

OTHER PUBLICATIONS

"Mobility Profiles and Future Location-based Services", *Directions Magazine*, by Sarfraz Khokhar and Arne Nilsson; http://www.directionsmag.com/printer.php?article_id=2268; 5 pages, Aug. 30, 2006.

* cited by examiner

*Primary Examiner* — Dwayne Bost
*Assistant Examiner* — Inder Mehra
(74) *Attorney, Agent, or Firm* — Baker Botts L.L.P.

(57) ABSTRACT

In accordance with one embodiment of the present disclosure, a method for mobility profiling includes collecting a plurality of locations of a mobile electronic device, determining at least one trajectory for the mobile electronic device from the plurality of locations, and storing the at least one trajectory in computer readable media. Each of the plurality of locations have a spatial and temporal component. Using the at least one trajectory, estimating a future location of the mobile electronic device, and communicating data to the mobile electronic device corresponding to the estimated future location such that the content of the communicated data is based on the future location.

25 Claims, 8 Drawing Sheets

METHOD AND SYSTEM FOR MOBILE TRAJECTORY BASED SERVICES

TECHNICAL FIELD

This disclosure relates in general to communication services, and more particularly to a method and system for mobile trajectory based services.

BACKGROUND

Various wireless positioning technologies exist that may be accessed through mobile electronic devices. Some technologies estimate geographical position with significant error. Other positioning technologies may provide estimations with better accuracy, but at the cost of higher power consumption and more expensive components and infrastructure.

BRIEF DESCRIPTION OF THE DRAWINGS

For a more complete understanding of the present disclosure and its advantages, reference is now made to the following description, taken in conjunction with the accompanying drawings, in which.

DESCRIPTION

Overview

In accordance with one embodiment of the present disclosure, a method for mobility profiling includes collecting a plurality of locations of a mobile electronic device, determining at least one trajectory for the mobile electronic device from the plurality of locations, and storing the at least one trajectory in computer readable media. Each of the plurality of locations have a spatial and temporal component. Using the at least one trajectory, estimating a future location of the mobile electronic device, and communicating data to the mobile electronic device corresponding to the estimated future location such that the content of the communicated data is based on the future location.

DETAILED DESCRIPTION

Figure 1:
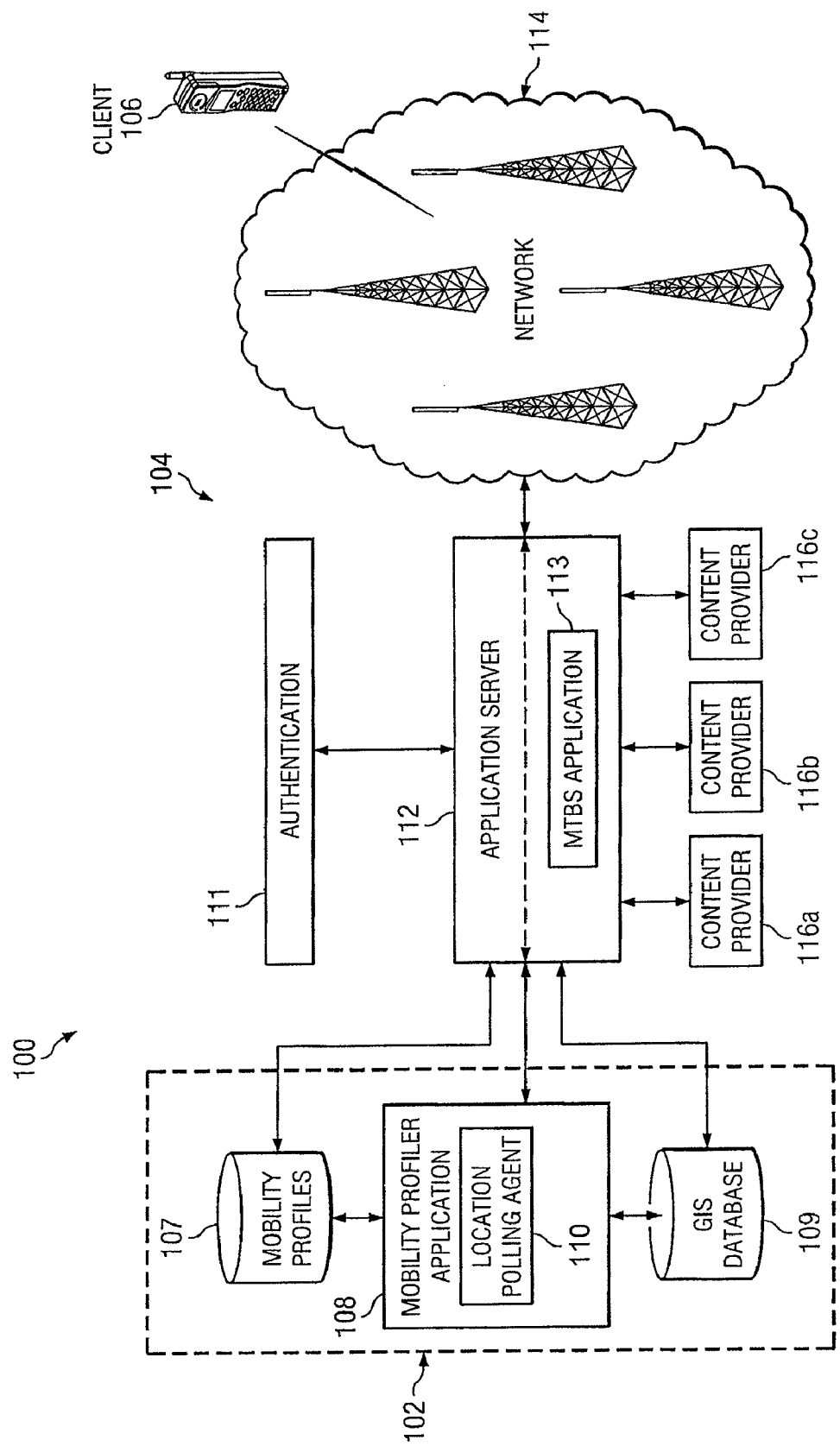
FIG. 1 is a block diagram of a portion of a communication system according to one embodiment of the present disclosure.

FIG. 1 is a block diagram of a portion of a communication system 100 according to one embodiment of the present disclosure. Communication system 100 is generally capable of generating mobility profiles of clients 106 and providing services accordingly. In general, communication system 100 includes a mobility profiling subsystem 102 and a service provisioning subsystem 104.

Mobility profiling subsystem 102 is generally operable to generate mobility profiles of clients 106, as explained further below. In the example embodiment, mobility profiling subsystem 102 includes a mobility profiler application 108 in communication with a mobility profiles database 107 and a Geographic Information System ("GIS") database 109. As a general overview, a location polling agent 110 triggers service provisioning subsystem 104 based on an algorithm to update an estimated location of a particular client 106. Mobility profiling application 108 matches each estimated client 106 location to map information stored in GIS database 109. A collection of such map-matched locations and corresponding time stamps may be used to estimate paths that the particular client 106 had traversed over time, which mobility profiling subsystem 102 appends to a corresponding mobility profile stored in mobility profiles database 107. As will be shown, various embodiments may use mobility profiling subsystem 102 and service provisioning subsystem 104 to provide various services by predicting a future location of clients 106.

Service provisioning subsystem 104 generally includes one or more clients 106 communicatively coupled to an application server 112 through a network 114. Application server 112 is also communicatively coupled to one or more content providers 116 and an authentication module 111. A mobility-profile-based service (MPBS) application 113 residing on application server 112 is generally capable of providing services to clients 106 and content providers 116 corresponding to the mobility profiles stored in mobility profiles database 107.

Clients 106 generally refer to any suitable device operable to communicate with application server 112 through network 114. For example, client 106 may be a personal digital assistant; a computer, such as, a laptop or a desktop; a mobile handset; or any other device operable to communicate with server 112 through network 114. In the example embodiment, however, each client 106 is a mobile phone associated with respective user. At some point, communication system 100 may generate mobility profiles for respective clients 106. The mobility profiles may be used to provide any of a variety of services, as explained further below.

Mobility profiles database 107 and GIS database 109 may include any suitable device capable of storing data, and facilitating addition, modification, and retrieval of such data. In the illustrated embodiment, mobility profiling subsystem 102, including databases 107 and 109, resides separate from application server 112. For example, all or a portion of mobility profiling subsystem 102 may reside in a separate dedicated server. In some other embodiments, however, all or a portion of mobility profiling subsystem 102 may reside within application server 112. For example, in some alternative embodiments, mobility profiles database 107, GIS database 109, and/or mobility profiler 108 may reside within application server 112. Although FIG. 1 illustrates mobility profiles database 107 and GIS database 109 as separate, in some embodiments databases 107 and 109 may reside in a single database.

Application server 112 may include, for example, a file server, a domain name server, a proxy server, a web server, a computer workstation, or any other suitable device. Application server 112 may execute with any of the well-known MS-DOS, PC-DOS, OS-2, MAC-OS, WINDOWS™, UNIX, or other appropriate operating systems, including future operating systems.

Network 114 refers to any interconnecting system capable of transmitting audio, video, signals, data, messages, or any combination of the preceding. Network 114 may comprise, for example, all or a portion of a public switched telephone network (PSTN), a public or private data network, a metropolitan area network (MAN), a wide area network (WAN), a local, regional, or global communication or computer network such as the Internet, or wireless network, an enterprise intranet, other suitable communication link, or any combination of the preceding.

In the example embodiment, network 114 provides mobile phone services. Mobile phones and the network they operate under vary significantly from provider to provider, and nation to nation. However, they typically communicate through electromagnetic microwaves with cell site base stations, the antennas of which are usually mounted on a tower, pole, or building. In some embodiments, these cell site base stations may be used as references for estimating a current location of each client 106. For example, such references may be used to estimate client 106 location using triangulation; however, any suitable network and client 106 location estimation technologies may be used. A collection of client 106 location points over time may be used to generate a mobility profile $T_{rA}$, as described further with reference to FIG. 2.

Figure 2:
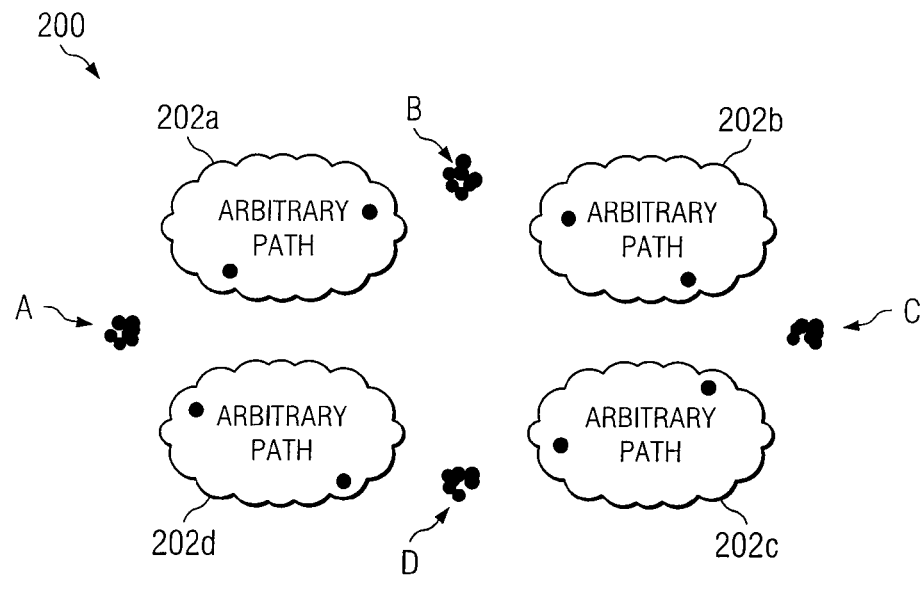
FIG. 2 is a diagram of location points that represent the trajectory of a particular client over time, as estimated by the communication system of FIG. 1.

FIG. 2 is collection of points 200 that represent the trajectories of a particular client 106 over time, as estimated by the communication system 100 of FIG. 1. Points 200 have spatiotemporal components (x,y,t), which may be used in the generation of a mobility profile $T_{rA}$. As illustrated by points 200, client 106 starts from a home location A, travels to locations B, C, and D, and then returns to the home location A. The resting locations A, B, C and D partition points 200 into trajectory legs 202. The illustrated example includes four trajectory legs 202a, 202b, 202c, and 202d, which client 106 traversed over the course of a single day. The location and time on a curve between temporally adjacent points 200 are interpolated from the known (x,y,t) of each point 200. In this manner, a virtually continuous path may be drawn between resting locations A, B, C, and D. Mobility profile $T_{rA}$ may be formed from a collection of recorded paths $T_{rAi}$ traversed by client 106 during a profiling period. For example, mobility profile $T_{rA}$ may be a collection of recorded paths $T_{rAi}$ traversed by client 106 during each day of a particular profiling week. Expressed as $T_{rA} = \{\cup T_{rAi} \forall i \in D, \cap T_{rAi} \neq \emptyset\}$, the operation $\cup$ on paths denotes concatenation of the same, where i∈D represents the paths traversed by client 106 for an arbitrary day.

Error in client 106 location estimates and the frequency at which such estimates are updated, or the polling frequency, may impact the accuracy of mobility profile $T_{rA}$. For example, points 200 may deviate considerably from the actual spatiotemporal coordinates of client 106. The virtual path constructed of points 200 may likewise differ from the actual path traversed by client 106. In addition, too low of a polling frequency may not adequately account for frequent directional changes of client 106. Although a high polling frequency might yield a good spatial distribution and increase profiling accuracy, very frequent polling could overburden communication system 100, in some embodiments. Substantial error in mobility profile $T_{rA}$ resulting from location estimates, path interpolation, and/or polling frequency may limit the performance of some mobile-profile services. Example methods of generating mobility profile $T_{rA}$ with enhanced efficiency and accuracy are described below with reference to FIGS. 3 through 8C.

Figure 3:
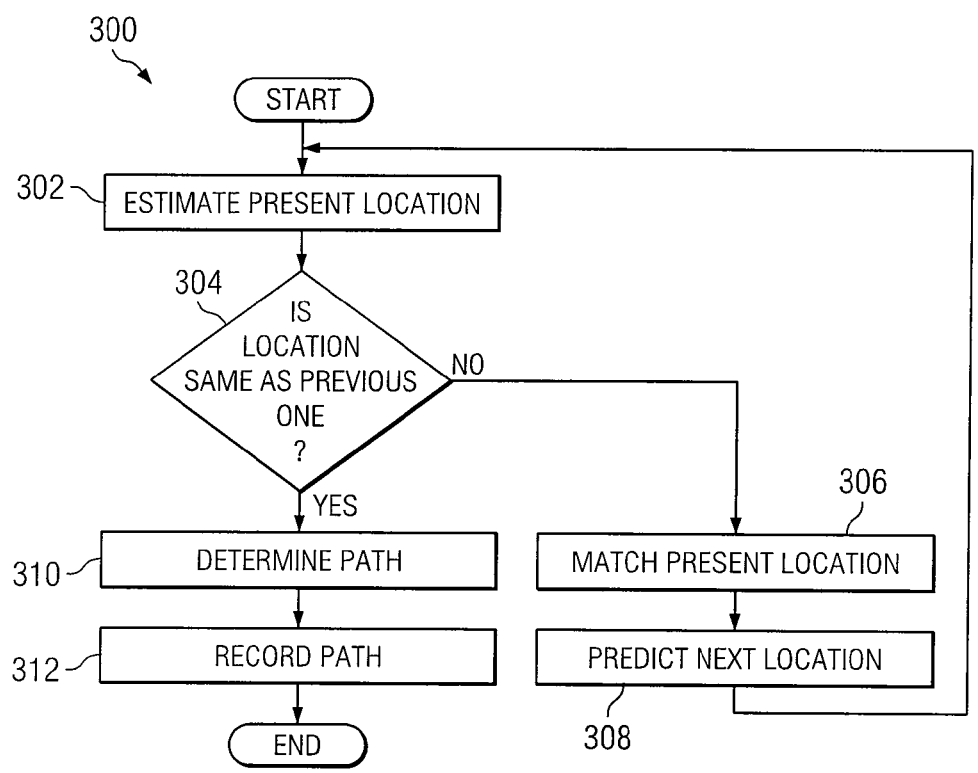
FIG. 3 is a flowchart illustrating one example method of generating a client mobility profile that may be used by the communication system of FIG. 1.

FIG. 3 is a flowchart illustrating one example method 300 of generating a portion of a client 106 mobility profile $T_{rA}$ that may be used by the communication system 100 of FIG. 1. At step 302, a present location point of client 106 is estimated. Any suitable location technology may be used for the estimation, such as, for example, radio triangulation or the Global Positioning System ("GPS").

In step 304, a determination is made regarding whether client 106 is at rest or in motion. For example, communication system 100 may consider whether consecutively estimated locations remain approximately the same within some preset error for a preset number of times. If client 106 is considered to be in motion, the location estimated in step 302 is then matched with information stored in GIS database 109 in step 306, as described further with reference to FIGS. 4A and 4B. A future location of client 106 is then predicted real-time in step 308, as described further with reference to FIG. 5. As will be shown, predicting future locations of client 106 may enable polling frequency optimization.

Figure 6A:
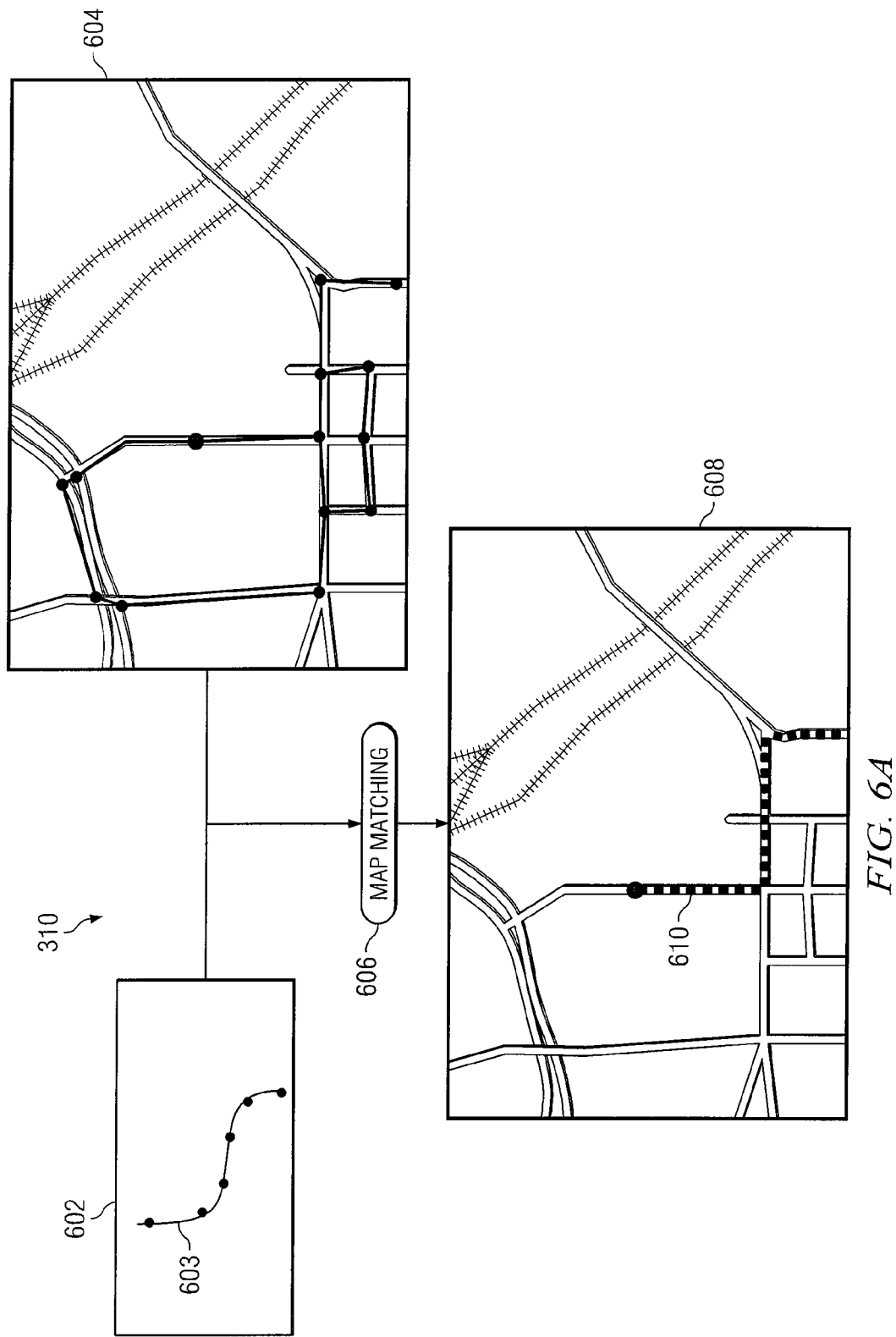
FIG. 6A is a flow diagram illustrating details of a path-determining method of FIG. 3 according to one embodiment of the present disclosure.

However, if client 106 is considered to be at rest in step 304, then the most likely path traversed by client 106 is determined in step 310, as described further with reference to FIG. 6A. In general, determining the most likely path may involve comparing virtual paths constructed from the information-matched locations of step 306 to additional information stored in GIS database 109. The determined path then is recorded in step 312.

Figure 4A:
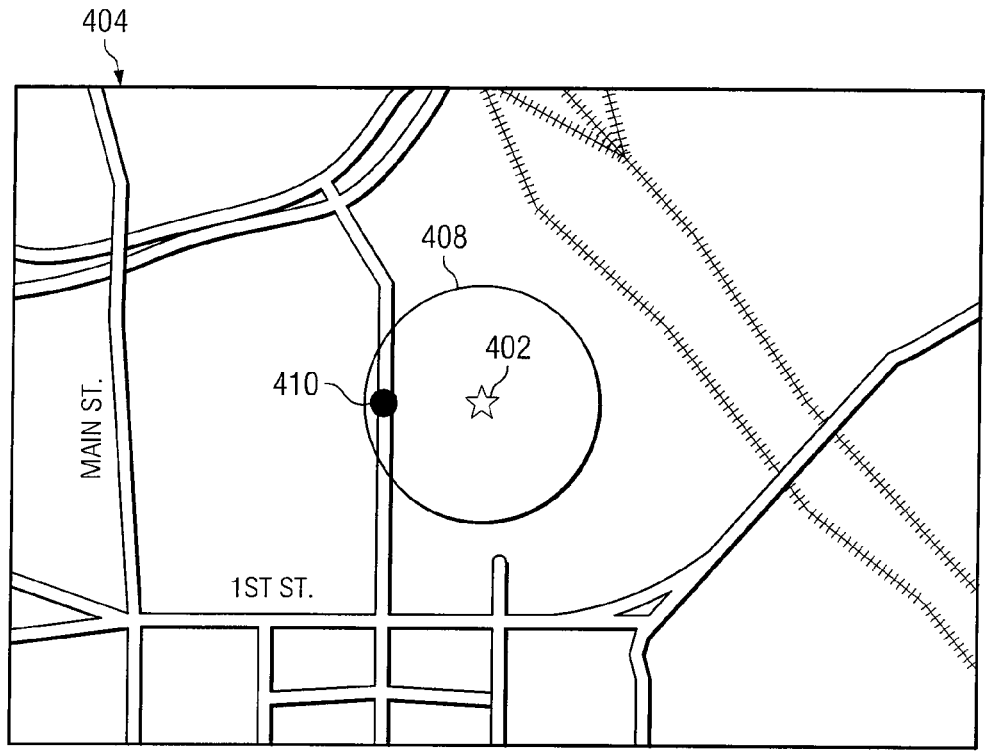
FIG. 4A is a diagram illustrating one example method of matching an estimated client location to map information encoded within computer-readable medium of the communication system of FIG. 1.

FIG. 4A is a diagram illustrating details of the matching method step 306 of FIG. 3 according to one embodiment of the present disclosure. In this example, step 306 involves matching an estimated location 402 of client 106 to features of a map 404 encoded in GIS database 109. Let the maximum error in client 106 location estimation be $\overset{\scriptscriptstyle\square}{E}$, for an underlying location estimation technology. Assume a constant (maximum error) for each estimated location point. Let the polylines representing a road segment (e.g., road segment 406) be denoted by $l_i$, where i denotes the road identification as stored in GIS database 109 and $s_{ij}$ denote the jth segment of $l_i$. Assume the exact location of the client 106 user's home (e.g., rest location A) is not known; however, in various embodiments, the home location may be provided by a client 106 user in the form of a home address. Proceeding with the above assumptions, in this example, matching estimated location 402 to features of map 404 includes seven steps, as described further with reference to FIG. 4B.

Figure 4B:
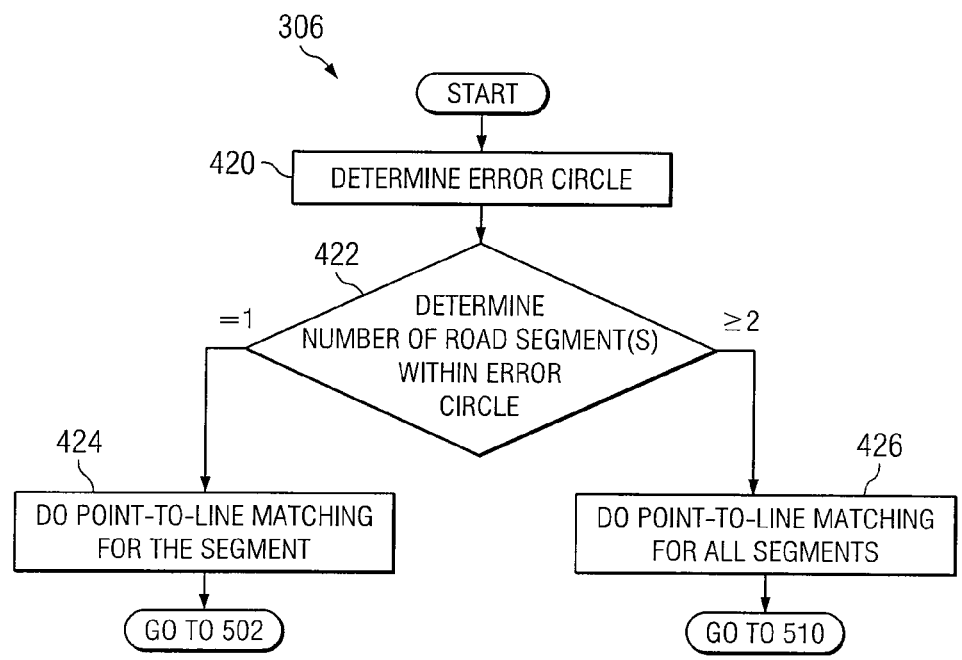
FIG. 4B is a flow chart further illustrating the example method of FIG. 4A.

FIG. 4B is a flow chart further illustrating details of the matching method step 306 of FIG. 3 according to one embodiment of the present disclosure. In step 420, a virtual circle 408 is drawn having radius $\overset{\scriptscriptstyle\square}{E}$ and a center at estimated location point 402, also represented as $P_r(x_r, y_r)$. Next, in step 422, a determination is made of how many road segments or polylines intersect circle 408—i.e. pass through the circle (e.g., road segment 406). Let $P_i(x_i, y_i)$ and $P_{i+1}(x_{i+1}, y_{i+1})$ be the points of an arbitrary line segment. One example condition to determine which road segments, $s_{ij}$, pass through the error circle may be derived as follows:

Let $$m = \frac{y_{i+1} - y_i}{x_{i+1} - x_i} \quad (1)$$

be the slope of the line segment, $s_{ij}$, passing through $$P_i(x_i, y_i) \text{ and } P_{i+1}(x_{i+1}, y_{i+1}), \text{ and} \quad (2)$$

$$b = \frac{y_i(x_i - x_{i+1}) + x_i(y_{i+1} - y_i)}{x_i - x_{i+1}}$$

be the y-intercept of the line segment, the line segment intersects the circle at the following two points:

$$x = \frac{my_r + x_r - mb}{1 + m^2} \pm \frac{\sqrt{\overset{\square}{E}^2 - [(y_r - mx_r - b)/\sqrt{1+m^2}]^2}}{\sqrt{1+m^2}} \quad (3)$$

$$y = \frac{m^2 y_r + mx_r + b}{1 + m^2} \pm m \frac{\sqrt{\overset{\square}{E}^2 - [(y_r - mx_r - b)/\sqrt{1+m^2}]^2}}{\sqrt{1+m^2}} \quad (4)$$

The discriminant, $$\Delta = \overset{\square}{E}^2 - [(y_r - mx_r - b)/\sqrt{1+m^2}]^2 = 0, \quad (5)$$

for the road segment to be the tangent to the error circle and if $$\Delta = \overset{\square}{E}^2 - [(y_r - mx_r - b)/\sqrt{1+m^2}]^2 > 0 \quad (6)$$

the road segment, $s_{ij}$, shall pass through the error circle $\overset{\square}{E}$. If $$\Delta = \overset{\square}{E}^2 - [(y_r - mx_r - b)/\sqrt{1+m^2}]^2 < 0 \quad (7)$$

the road segment, $s_{ij}$, shall not pass through the error circle $\overset{\square}{E}$.

In addition to the condition in equation (6) the following condition must fulfill for the road segment to pass through the error circle.

$$0 \le \frac{m(y_r - y_k) + (x_r - x_k)}{\sqrt{m^2 + 1}} \le D \quad (8)$$

where D is Euclidian distance between $(x_k, y_k)$ and $(x_{k+1}, y_{k+1})$, i.e.

$$D = (x_{k+1} - x_k)\sqrt{m^2 + 1} \quad (9)$$

Substituting the value for m in both equations (6) and (8) shall yield conditions where we don't have to deal with slope.

In this example, although the illustrated portion of map 404 contains several roads and a railroad, only one road 406 segment is within circle 404. Accordingly, in step 424, the erroneous location point 402, $P_r(x_r, y_r)$, is mapped to the road segment to find corrected location 410, also represented as $P_c(x_c, y_c)$.

However, if more than one road segment exists, then, in step 426, location point erroneous location point 402, $P_r(x_r, y_r)$, are mapped to all the road segments, $s_{ij}$, in the error circle, to determine $P_{ci}(x_{ci}, y_{ci})$, where i=1, 2, 3, ... M, and where M is the number of line segments passing through the circle. The following is one example of point-to-lines mapping to determine candidate-corrected points. Let $P_k(x_k, y_k)$ and $P_{k+1}(x_{k+1}, y_{k+1})$ be the points of the line segment. Then the corrected location can be found by solving the linear equations:

$$y - y_r = \left[\frac{x_{k+1} - x_k}{y_k - y_{k+1}}\right](x - x_r) \quad (10)$$

$$y - y_k = \left[\frac{y_{k+1} - y_k}{x_{k+1} - x_k}\right](x - x_k) \quad (11)$$

Let $m = \frac{y_{k+1} - y_k}{x_{k+1} - x_k}$, the slope of the line segment.

The corrected location is:

$$P_c(x_c, y_c) = \left(\frac{x_r + m(mx_k - y_k + y_r)}{m^2 + 1}, \frac{y_k + m(my_r - x_k + x_r)}{m^2 + 1}\right) \quad (12)$$

Thus, in the case of multiple line segments, equations (10) through (12) may be used to determine the candidate-corrected points.

Figure 5:
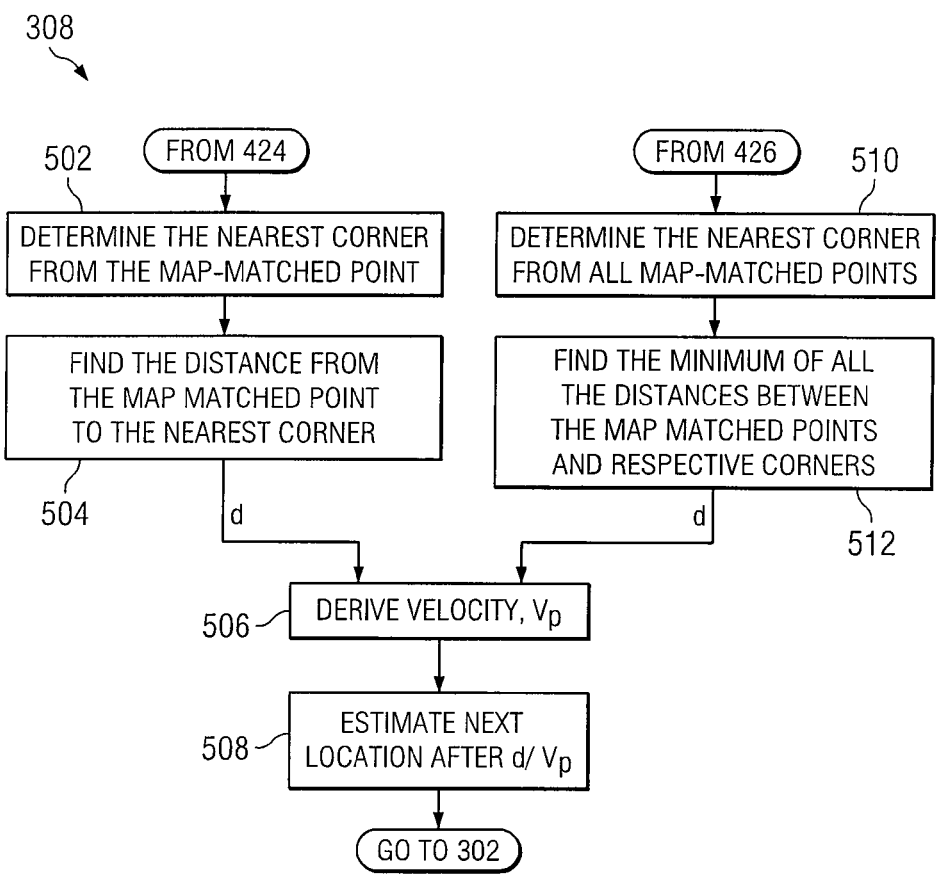
FIG. 5 is a flow chart illustrating details of a location-predicting method of FIG. 3 according to one embodiment of the present disclosure.

FIG. 5 is a flow chart illustrating details of the location-predicting method 308 of FIG. 3 according to one embodiment of the present disclosure. The ability to predict future locations of client 106 may optimize polling frequency, among other things, and hence enhance the efficiency and accuracy of mobility profiling. For example, communication system 100 may estimate when client 106 might change direction and trigger polling agent 110 accordingly. Updating client 106 location in accordance with potential directional changes, such as, for example, near corners, forks, curves, or cross-roads, may improve the accuracy of path interpolation between spatiotemporal data points 200. To ensure polling agent 110 triggers as client 106 might approach and/or pass such a location, this example uses, in general, the map-matched locations of step 306, information in GIS database 109, and a derived or assumed velocity of client 106.

In this example, if just one road segment $s_i$ is determined in step 422 of FIG. 4B, then a location of the nearest corner (turns) of segment $s_i$ is determined in step 502, using map data encoded in GIS database 109. Let $P_i(x_i, y_i)$ be the corner points of the road segments $s_i$. The distances between corners $P_i(x_i, Y_i)$ and the presumed client location are determined in step 504. The presumed client location, in this example, is the most recent map-matched point along road segment $s_i$, as determined previously in step 306. The closest corner to the presumed client location may be represented as $d = \min\|P_c - P_i\|$.

Next, in step 506, the velocity of client 106 is derived. Velocity may be derived, for example, as a time derivate of estimated and/or map-matched client 106 locations, from the speed limit of road segment $s_i$, from the expected speed of road segment $s_i$ in light of the time and/or day in question, from the measured velocity of other cell phones traveling near road segment $s_i$ around the same time, or in any other suitable way.

In step 508, a future location of client 106 is estimated using the derived velocity of step 506. For example, let $v_{pi}$ be the posted speed limit associated with line segment $s_{ij}$, as encoded in GIS database 109. Estimate the time $$T_j = \frac{d}{v_{pi}}$$

when client 106 may possibly reach a corner, where $v_{pi}$ is the speed of the shortest road segment corresponding to the minimum distance $d=\min\|P_c-P_i\|$ found in step 504. Polling agent 110 may then be triggered at a moment, or at moments, proximate this estimated time $T_j$. When polling agent 110 is triggered, this example method loops back to step 302 of FIG. 3.

Location-predicting method 308 follows similar steps if more than one road segments $s_i$ is determined in step 422 of FIG. 4B. In step 510, a location of the nearest corner (turns) is determined for all the map-matched segments $s_{ij}$ generated in step 426. Next, in step 512, a minimum of all the distances between the map-matched points and respective corners are determined in step 502, using map data encoded in GIS database 109. Using this minimum distance value, and the actions previously described with reference to steps 506 and 508, a future client 106 location may be estimated. Polling agent 110 is triggered accordingly, which again loops this example method loops back to step 302 of FIG. 3.

As previously mentioned with reference to step 304, if client 106 is deemed to be at rest after one or more location estimations, then the example method 300 proceeds to determine and record the path, in steps 310 and 312 respectively, which client 106 had traversed. A collection of such paths may be used to generate mobility profile $T_{rA}$.

FIG. 6A is a flow diagram illustrating details of the path-determining method 310 of FIG. 3 according to one embodiment of the present disclosure. In this example, determining the path traversed by client 106 generally involves three steps illustrated as blocks 602, 604, and 606, which may be implemented in any suitable order. Block 608 illustrates the determined virtual path as a dotted line 610.

Block 602 illustrates the step of generating a pre-matched curve 603, also represented as $T_{rAi,j,c}$, by connecting the centroid of map-matched points and trajectory segments between resting endpoints (e.g., between rest locations A and B of trajectory leg 202a in FIG. 2). Block 604 illustrates the step of forming a set of candidate curves $T_{rAi,j,p}$ using information encoded in GIS database 109. Each candidate curve is indicative of a hypothetical path connecting the two endpoints. Hypothetical paths may be determined, for example, using the coordinates of roads, intersections, walkways, rivers, railroads, subways, or any other suitable feature encoded within GIS database 109. In other words, this example assumes that client 106 had traversed a path that generally followed various map features. In block 606, logic determines which among the candidate curves $T_{rAi,j,p}$ best matches the pre-matched curve 603 ($T_{rAi,j,c}$) as described further with reference to FIG. 6B.

Figure 6B:
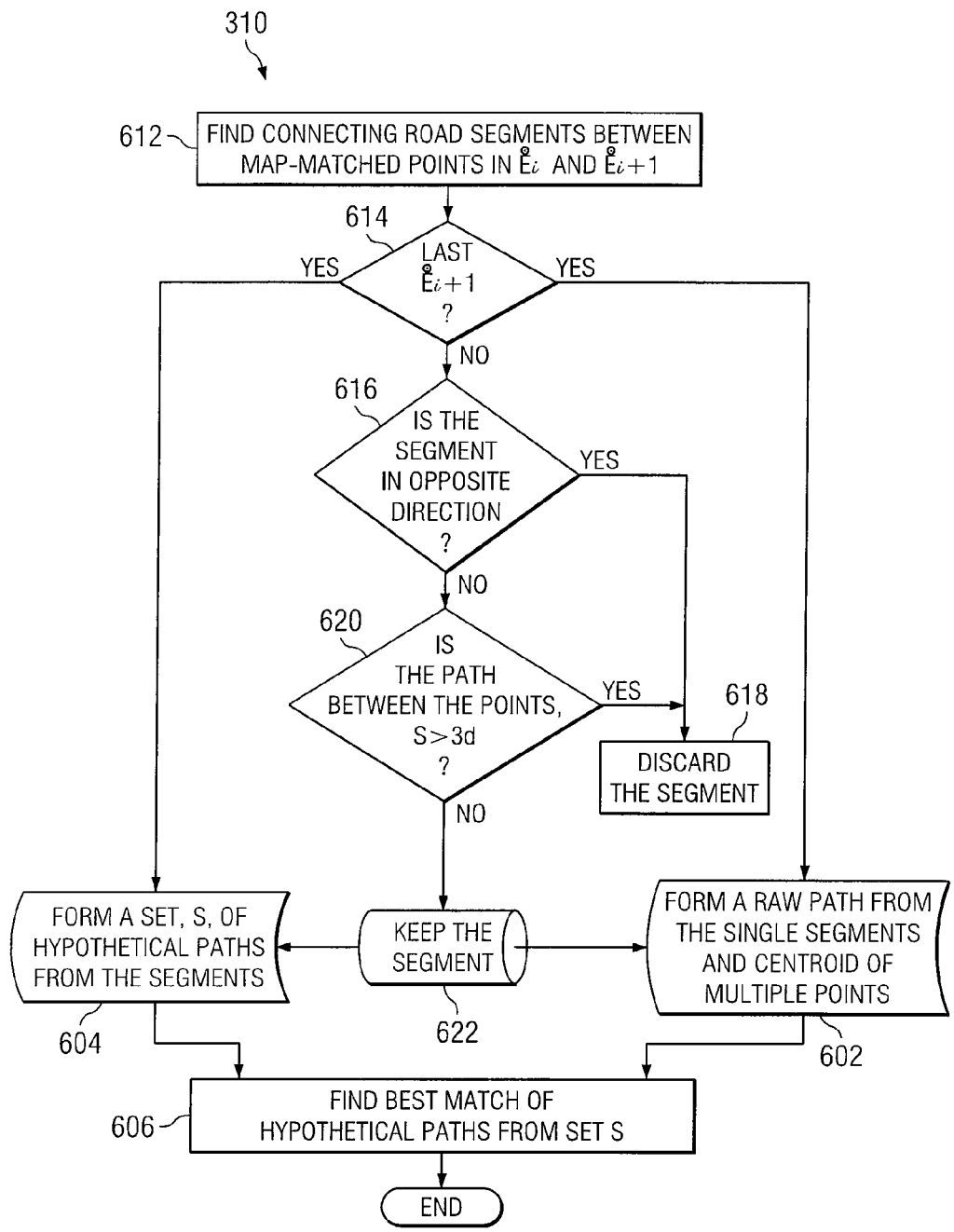
FIG. 6B is a flow diagram further illustrating details of logic that may be used for the path-determining method of FIG. 3, according to one embodiment of the present disclosure.

FIG. 6B is a flow diagram further illustrating details of logic that may be used for the path-determining method 310 of FIG. 3 according to one embodiment of the present disclosure. This example assumes client 106 had traversed a path that generally followed various map features. In general, logic is performed on the map-matched locations and information in GIS database 109 to eliminate the hypothetical paths down to one probable path traversed by client 106. A determination of all the connecting road segments, if any, from one map-matched point in the error circle $\overset{\circ}{E}_i$ to the map-matched points of the next circle $\overset{\circ}{E}_{i+1}$ is performed in step 612. In step 614, a determination is made regarding whether the next circle $\overset{\circ}{E}_{i+1}$ is the last. If $\overset{\circ}{E}_{i+1}$ is not the last, then logic may be used to determine whether or not to discard or keep each connecting segment.

For example, in steps 616 and 618, all road segments are in opposite direction of the user motion are eliminated. Let $P_{r+1}(x_{r+1},y_{r+1})$ be the estimated location and $P_r(x_r,y_r)$ be the previous location. Let $P_k(x_k,y_k)$ and $P_{k+1}(x_{k+1},y_{k+1})$ be two points on a candidate line segment.

$$\text{Let } \phi = \tan^{-1}\left[\frac{|(y_{k+1}-y_k)(y_{r+1}-y_r)|}{(x_{k+1}-x_k)(x_{r+1}-x_r)-(y_{k+1}-y_k)(y_{r+1}-y_r)}\right],$$

if $$-\frac{3\pi}{4} < \phi < \frac{3\pi}{4} \forall s_i,$$

containing $P_k(x_k,y_k)$ and $P_{k+1}(x_{k+1},y_{k+1})$, eliminate those $s_i \forall i$.

Similarly, in steps 618 and 620, eliminate all road segments that are connected between the two error circles $\overset{\circ}{E}_i$ and $\overset{\circ}{E}_{i+1}$, if the client 106 travel time on those line segment are >> than the direct travel time—i.e.

$$\frac{\sum_{n \in S_L} s_n}{v_n} \Box T_j,$$

where $S_L$ is the set of $s_i$ of the eliminating candidates. A largest permissible detour from one point in the error circle $\overset{\circ}{E}_i$ to the next one $\overset{\circ}{E}_{i+1}$ is three-dimensional (three sides of a square of length d), where $d=\|\overset{\circ}{E}_{i+1}-\overset{\circ}{E}_i\|$. The assumption here is that the maximum detour a user of client 106 shall take between two adjacent points on an imaginary square is going through the three sides of the square. Road segments that are not eliminated in steps 616 through 620 are kept in step 622. These remaining segments are used to generate the pre-matched path and hypothetical paths of steps 602 and 604 respectively; and a best match then is performed in step 608, as described previously with reference to FIG. 6A.

Figure 7:
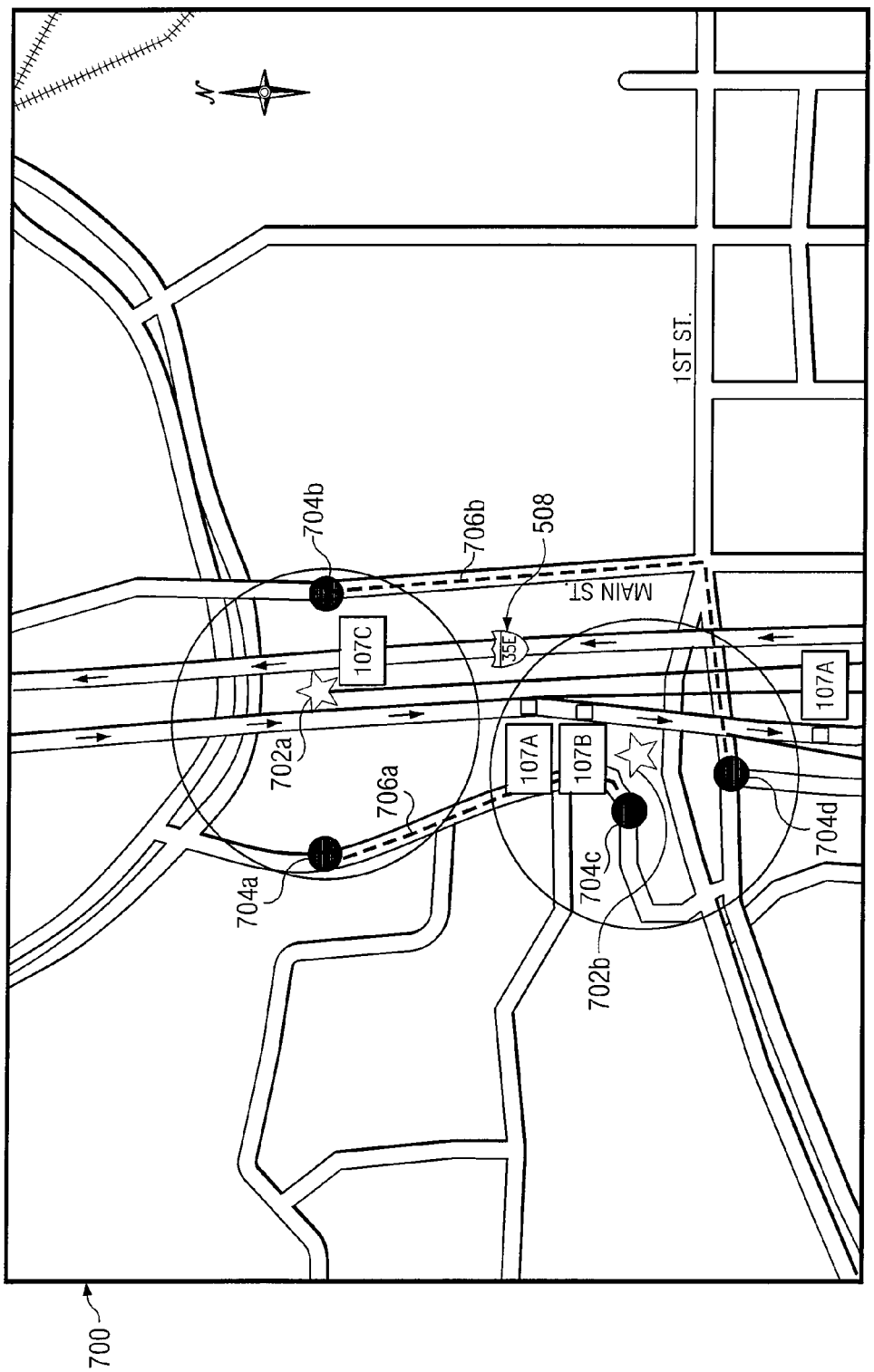
FIG. 7 is a diagram further illustrating example methods of enhancing the accuracy of the estimated path of FIGS. 6A and 6B.

FIG. 7 is a diagram 700 further illustrating example methods of enhancing the accuracy of the estimated path of FIGS. 6A and 6B. This example implements traffic speed and permissible direction as profiling constraints in addition to those discussed in steps 616 through 620. Assume point 702a is a previously estimated client 106 location and point 702b is the current estimated location. Among the candidate line segments for these two estimated locations 702a and 702b are those represented by points 704a, 704b, 704c, and 704d, which are distributed along access roads 706a and 706b adjacent to a freeway 708.

The traffic speed of the illustrated section of freeway 708 may be determined, for example, from the speed limit of a particular road segment, the expected speed corresponding to the time and/or day in question, the measured velocity of other cell phones traveling along the pertinent road segment at the same time, or in any other suitable way. This example presumes the determined traffic speed associated with the illustrated section of freeway 708 is much greater than either access road 706a or 706b.

The traffic directions of freeway 708, access road 706a, and access road 706b also differ in some regards. The illustrated section of freeway 708 is a divided freeway having multiple lanes traveling in either a northward or southward direction. Traffic along access road 706a flows one-way in a southward direction; and traffic along access road 706b is on-way in a northward direction.

In this example, a comparison of the derived velocity of client 106 to the traffic speed of freeway 708 eliminates all candidate line segments along freeway 708. In other words, client 106 probably would have traveled more quickly between estimated points 702a and 702b had it traveled along freeway 708.

Applying these two constraints, the most likely path traversed by client 106 probably follows either access road 706a or access road 706b. Access road 706b may be eliminated, however, because it allows traffic only in northward direction. Conversely, access road 706a allows traffic in the same direction as the client 106 trajectory. The most likely path traversed by client 106, therefore, is probably from point 704a to point 704c.

Figure 8A:
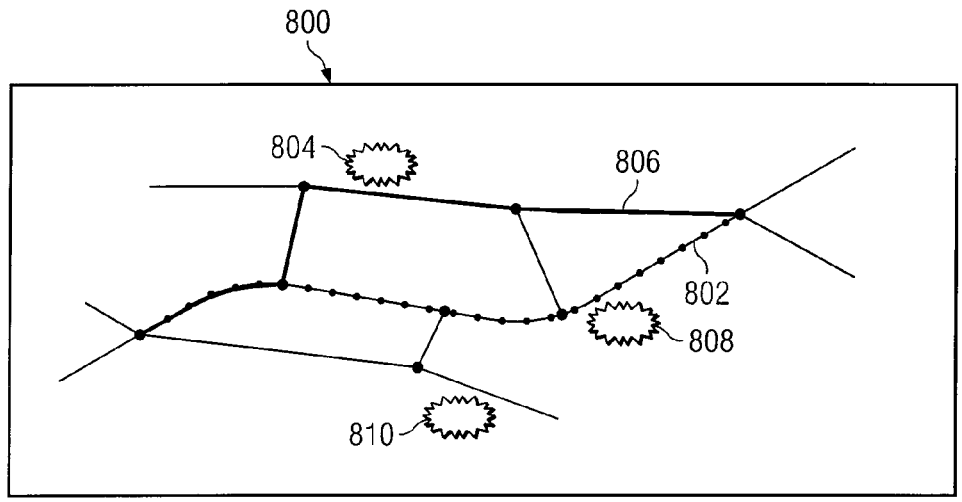
FIG. 8A is a diagram illustrating examples of how the communication system of FIG. 1 can provide services based on previously generated mobility profiles of clients, according to one embodiment of the present disclosure.

FIG. 8A is a diagram 800 illustrating examples of how communication system 100 can provide services based on previously generated mobility profiles $T_{rA}$ of clients 106, according to one embodiment of the present disclosure. In a first example, a client 106 user may wish to know the location of a flower shop closest to a commute from work to home. Client 106 communicates this request to application server 112 through network 114. Authentication module 111 establishes client 106 credentials. Application server 112 queries mobility profiles database 107 to determine an estimated future path 802 that client 106 normally would take. In this example, path 802 deviates from other days of the week because the client 106 user typically picks up several children from daycare. Application server 112 queries GIS database 109 to determine the location of the closest flower shop 804 based on the estimated path 802 for that day. Application server 112 sends directions to client 106 accordingly corresponding to a recommended alternate route 806 that passes by both the flower shop 804 and the daycare center.

In a second example, a client 106 user may wish to know current traffic conditions and whether an alternative route would save time. The process may be substantially similar to the first example, with a few exceptions. For example, application server 112 may communicate with a content provider 116, as opposed to GIS database 109, to determine current traffic conditions corresponding to an estimated future path of the client 106 user. Application server 112 determines an alternate route is likely faster based on current traffic conditions, and sends the alternate directions to client 106 accordingly.

In a third example, a particular content provider 116 may wish to send a soft coupon to any client 106 that is expected to come within two miles of a store during a particular time period (e.g., store locations 808 and/or 810). Content provider 116 communicates this request to application server 112. In some embodiments, content provider 116 may communicate this request using client 106. Authentication module 111 establishes credentials of content provider 116. Application server 112 queries mobility profiles database 107 to find all mobility profiles $T_{rA}$ of clients 106 that match the parameters of the request. Application server 112 sends the soft coupons to such clients 106 accordingly. In some embodiments, application server 112 may wait for an event, or an expected event, before sending the soft coupon. For example, application server 112 may wait until client 106 is expected to begin a particular path, such as, for example, a driven path from work to home.

Figure 8B:
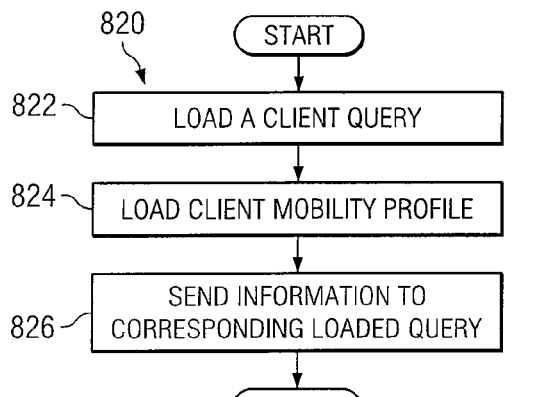
FIGS. 8B and 8C are flowcharts illustrating example methods of implementing the mobility-profile-based services described in FIG. 8A.
Figure 8C:
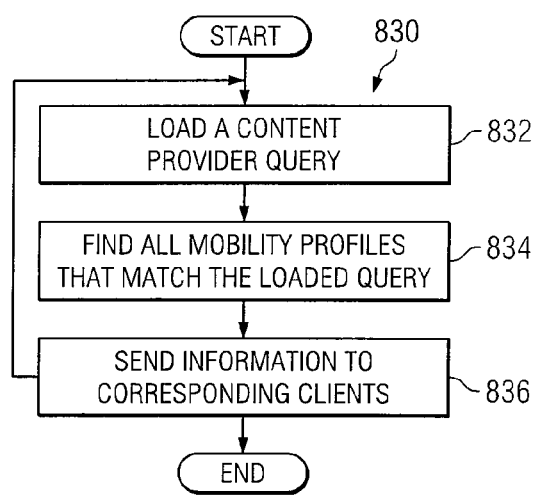

FIGS. 8B and 8C are flowcharts illustrating example methods 820 and 830 of implementing the mobility-profile-based services described in FIG. 8A. The method 820 of FIG. 8B may be used, for example, to implement the previously described service of generating a convenient path to a flower shop. A client 106 query is loaded in step 822. Next, in step 824, a corresponding client 106 mobility profile $T_{rA}$ is loaded. Information corresponding to the loaded query is returned to client 106 in step 826.

The method 830 of FIG. 8C may be used, for example, to implement the previously described soft-coupon service. In step 832 a query from a content provider 116 is loaded. All mobility profiles that match the loaded query are determined in step 834. Next, in step 836, information is sent to corresponding clients 106 in accordance with the query.

Although the present disclosure has been described with several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. A method comprising:
   collecting a plurality of locations of a mobile electronic device, each of the plurality of locations having a spatial and temporal component;
   determining, by a computing system, a mobility profile for the mobile electronic device based at least in part on at least a subset of the plurality of locations of the mobile device, the mobility profile identifying a route traversed repeatedly by the mobile device, each repeated traversal of the route by the mobile electronic device having occurred during a respective one of a plurality of periodically recurring time periods;
   storing the mobility profile in computer readable media;
   estimating, based at least in part on the mobility profile, a future location of the mobile electronic device, the future location having a spatial and a temporal component; and
   communicating data to the mobile electronic device corresponding to the estimated future location, the content of the communicated data based on the future location.

2. The method of claim 1, further comprising determining the route traversed repeatedly by the mobile electronic device by matching the at least a subset of the plurality of locations of the mobile device to one or more elements of a map.

3. The method of claim 1, wherein the communicated data comprises information selected from the group consisting of:
   a traffic condition;
   a roadwork alert;
   a route advisory;
   a weather condition;
   directory assistance;
   an advertisement; and
   directions.

4. The method of claim 1, further comprising communicating the estimated future location of the mobile electronic device to a database.

5. The method of claim 1, wherein the mobile electronic device is a device selected from the group consisting of:
   a mobile phone;
   a pager;
   a personal digital assistant;
   a handheld computer; and a Global Positioning System handheld.

6. The method of claim 1, wherein the respective one of a plurality of periodically recurring time periods is particular day of the week.

7. The method of claim 1, further comprising:
receiving a request for directions; and
sending the directions based at least in part on the determined mobility profile.

8. The method of claim 1, wherein estimating, based at least in part on the mobility profile, the future location of the mobile electronic device further comprises deriving the velocity of the mobile electronic device.

9. A non-transitory computer-readable medium encoded with logic, the logic operable when executed by a computing system to:
collect a plurality of locations of a mobile electronic device, each of the plurality of locations having a spatial and temporal component;
determine a mobility profile for the mobile electronic device based at least in part on at least a subset of the plurality of locations of the mobile device, the mobility profile identifying a route traversed repeatedly by the mobile device, each repeated traversal of the route by the mobile electronic device having occurred during a respective one of a plurality of periodically recurring time periods;
store the mobility profile in computer readable media;
estimate, based at least in part on the mobility profile, a future location of the mobile electronic device, the future location having a spatial and a temporal component; and
communicate data to the mobile electronic device corresponding to the estimated future location, the content of the communicated data based on the future location.

10. The computer-readable medium of claim 9, further comprising determining the route traversed repeatedly by the mobile electronic device by matching the at least a subset of the plurality of locations of the mobile device to one or more elements of a map.

11. The computer-readable medium of claim 9, wherein the communicated data comprises information selected from the group consisting of:
a traffic condition;
a roadwork alert;
a route advisory;
a weather condition;
directory assistance;
an advertisement; and
directions.

12. The computer-readable medium of claim 9, wherein the logic is further operable to communicate the estimated location of the mobile electronic device to a database.

13. The computer-readable medium of claim 9, wherein the mobile electronic device is a device selected from the group consisting of:
a mobile phone;
a pager;
a personal digital assistant;
a handheld computer; and
a Global Positioning System handheld.

14. The computer-readable medium of claim 9, wherein the respective one of a plurality of periodically recurring time periods is particular day of the week.

15. The computer-readable medium of claim 9, wherein the logic is further operable to:
receive a request for directions; and
send the directions based at least in part on the determined mobility profile.

16. The computer-readable medium of claim 9, wherein:
the logic is further operable to derive the velocity of the mobile electronic device; and
the estimation is based on the determined mobility profile and the derived velocity.

17. A method comprising:
means for collecting a plurality of locations of a mobile electronic device, each of the plurality of locations having a spatial and temporal component;
means for determining a mobility profile for the mobile electronic device based at least in part on at least a subset of the plurality of locations of the mobile device, the mobility profile identifying a route traversed repeatedly by the mobile device, each repeated traversal of the route by the mobile electronic device having occurred during a respective one of a plurality of periodically recurring time periods;
means for storing the mobility profile in computer readable media;
means for estimating, based at least in part on the mobility profile, a future location of the mobile electronic device, the future location having a spatial and a temporal component; and
means for communicating data to the mobile electronic device corresponding to the estimated future location, the content of the communicated data based on the future location.

18. The method of claim 17, further comprising means for determining the route traversed repeatedly by the mobile electronic device by matching the at least a subset of the plurality of locations of the mobile device to one or more elements of a map.

19. The method of claim 17, wherein the communicated data comprises information selected from the group consisting of:
a traffic condition;
a roadwork alert;
a route advisory;
a weather condition;
directory assistance;
an advertisement; and
directions.

20. A communication system comprising:
a mobility profiling subsystem having one or more databases and operable to:
collect a plurality of locations of a mobile electronic device, each of the plurality of locations having a spatial and temporal component;
determine a mobility profile for the mobile electronic device based at least in part on at least a subset of the plurality of locations of the mobile device, the mobility profile identifying a route traversed repeatedly by the mobile device, each repeated traversal of the route by the mobile electronic device having occurred during a respective one of a plurality of periodically recurring time periods;
store the mobility profile in the one or more databases;

estimate, based at least in part on the determined mobility profile, a future location of the mobile electronic device, the future location having a spatial and a temporal component; and communicate data to the mobile electronic device corresponding to the estimated future location, the content of the communicated data based on the future location.

21. The communication system of claim 20, wherein the mobility profiling subsystem is further operable to determine the route traversed repeatedly by the mobile electronic device by matching the at least a subset of the plurality of locations of the mobile device to one or more elements of a map.

22. The communication system of claim 20, wherein the data communicated by the mobility profiling subsystem comprises information selected from the group consisting of:
   a traffic condition;
   a roadwork alert;
   a route advisory;
   a weather condition;
   directory assistance;
   an advertisement; and
   directions.

23. The communication system of claim 20, wherein the mobile electronic device is a device selected from the group consisting of:
   a mobile phone;
   a pager;
   a personal digital assistant;
   a handheld computer; and
   a Global Positioning System handheld.

24. A communication system comprising:
   a mobility profiling subsystem having one or more databases and operable to:
      collect a plurality of locations of a mobile electronic device, each of the plurality of locations having a spatial and temporal component;
      determine at least one trajectory for the mobile electronic device from the plurality of locations encoded within the one or more databases;
      store the at least one trajectory in the one or more databases;
      estimate, based on the determined path, a future location of the mobile electronic device, the future location having a spatial and a temporal component; and
      communicate data to the mobile electronic device corresponding to the estimated future location, the content of the communicated data based on the future location; and
   a location polling agent operable to control the frequency at which the collection of the plurality of locations are updated.

25. The communication system of claim 24, wherein the frequency controlled by the location polling agent is at least partially based on the estimated future location.

* * * * *